US006231223B1

(12) United States Patent
Zucar et al.

(10) Patent No.: US 6,231,223 B1
(45) **Date of Patent: *May 15, 2001**

(54) INTERMEDIATE FASTENING ELEMENT FOR FITTING A REFLECTOR ON A SUPPORT ELEMENT OF A HEADLAMP

(75) Inventors: Juan Zucar; Amador Cano, both of Creteil (FR)

(73) Assignee: Valeo Vision (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,758

(22) Filed: Jul. 30, 1997

(30) Foreign Application Priority Data

Jul. 31, 1996 (FR) ..................................................... 96 09650

(51) Int. Cl.[7] ........................................................ B60Q 1/06

(52) U.S. Cl. ............................................ 362/528; 362/516

(58) Field of Search .................................... 362/528, 463, 362/515, 516, 353; 411/510

(56) References Cited

U.S. PATENT DOCUMENTS 3,252,677 * 5/1966 Raymond ............................ 411/510
3,810,279 * 5/1974 Swick ....................................... 85/80
4,621,307 * 11/1986 Weber ................................. 362/226
4,689,725 * 8/1987 Saijo et al. .......................... 362/428
4,722,029 * 1/1988 Ahle et al. .......................... 362/226
4,849,860 * 7/1989 Schauwecker ....................... 362/324
5,161,876 * 11/1992 Smith .................................... 362/66
5,672,038 * 9/1997 Eaton .................................. 411/510
5,800,109 * 9/1998 Carruthers ........................... 411/510

FOREIGN PATENT DOCUMENTS 344 549 12/1958 (CH) .
29 17 476 A1 11/1980 (DE) .
596 428 A1 5/1994 (EP) .

OTHER PUBLICATIONS

French Search Report dated Apr. 21, 1997.

* cited by examiner

*Primary Examiner*—Thomas M. Sember
*Assistant Examiner*—Peggy A. Neils
(74) *Attorney, Agent, or Firm*—Morgan & Finnegan, LLP

(57) ABSTRACT

A motor vehicle headlamp has a reflector which is mounted on a support element of the headlamp by means of an interposed intermediate fastening element having a first end for cooperating with the support element of the headlamp, and a second end which cooperates with a mounting component of the reflector, in a fitting direction along which the intermediate fastener is inserted into the mounting component. The intermediate fastener has resiliently deformable fins which extend transversely to the fitting direction and which are engaged with a smooth surface of the mounting component of the reflector, while deforming so as to retain the fastener by friction irremovably in the mounting component of the reflector.

26 Claims, 2 Drawing Sheets

20
20
14
14
10
10
12
12

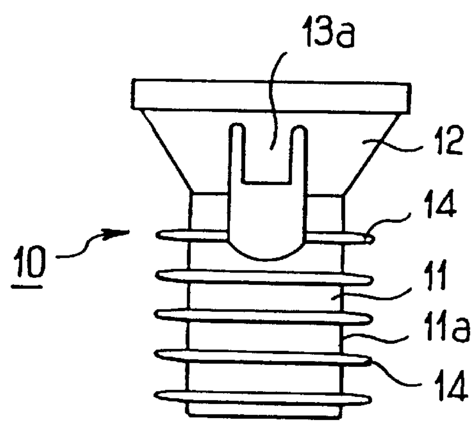
FIG_1
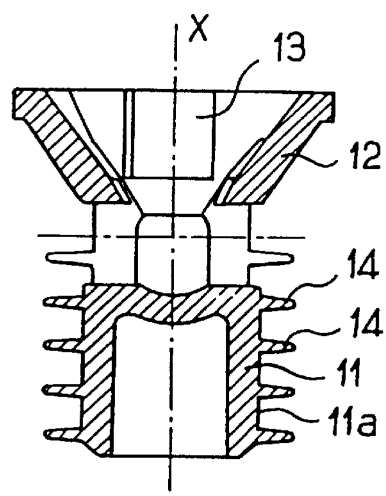
FIG_2
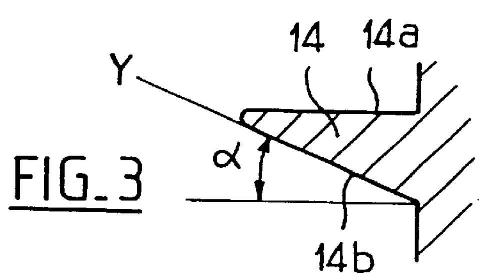
FIG_3
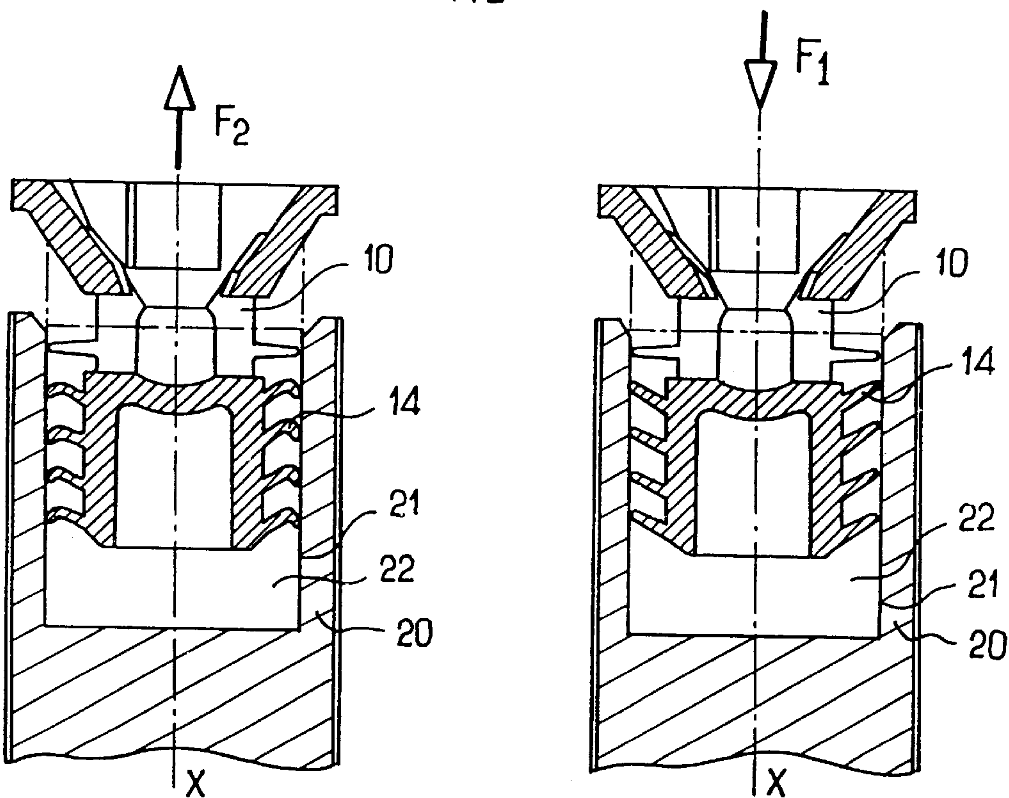
FIG_5
FIG_4

INTERMEDIATE FASTENING ELEMENT FOR FITTING A REFLECTOR ON A SUPPORT ELEMENT OF A HEADLAMP

FIELD OF THE INVENTION

The present invention relates in general terms to the fitting of a reflector on to a support element of a motor vehicle headlamp. More particularly, the invention is concerned with a motor vehicle headlamp comprising a reflector which is mounted on a support element of the headlamp by means of an interposed intermediate fastening element having a first end adapted to cooperate with the said support element, and further having a second end which is adapted to cooperate with a mounting component of the said reflector, in a direction of fitting and removal.

The invention also relates to such an intermediate fastening element, for such an assembly.

BACKGROUND OF THE INVENTION

Headlamps are already known, with or without a headlamp housing, in which the reflector is mounted through an intermediate mounting rod, one end of which is screwed, or otherwise secured, in a fixed portion of the headlamp. Such a mounting rod includes at its other end a spherical head which is arranged to be snap-fitted in a mounting socket of the reflector. The spherical head therefore constitutes a support element of the headlamp. In order to enable the spherical head of the mounting rod to cooperate with the mounting socket of the reflector, it is necessary that the mounting socket should have a specific configuration, of the type consisting of a spherical housing the form of which is complementary to that of the spherical head.

In addition, a motor vehicle headlamp is known in which the reflector is mounted by means of an interposed fitting sleeve, on an appropriate support element of the headlamp. This mounting sleeve includes a mounting or fitting tongue which extends in the direction of fitting and removal of the sleeve into the mounting socket of the reflector. The fitting tongue includes at its end a snap-fitting tooth which is adapted to be snapped into engagement on the outer wall of the mounting socket during engagement of the mounting sleeve in the socket in the above mentioned fitting direction.

In all the headlamps of the above known types, it is necessary, for fitting the reflector, to make a mounting socket of a specific form which enables it to cooperate with an intermediate fastening element, and this involves steps in the manufacture of the reflector which are of some complexity, so that there are associated extra manufacturing costs for the headlamp as a whole.

DISCUSSION OF THE INVENTION

In order to overcome the disadvantages of the state of the art described above, an object of the present invention is to provide a novel headlamp for a motor vehicle, of the general type discussed above, but in which the fitting of the reflector on a support element of the headlamp is particularly simple and inexpensive.

According to the invention in a first aspect, a motor vehicle headlamp comprising a reflector mounted on a support element by means of an interposed intermediate fastening element, having a first end adapted to cooperate with the said support element and a second end adapted to cooperate with a mounting component of the said reflector in a fitting and removal direction, is characterised in that the said intermediate fastening element includes resiliently deformable fins which extend generally and substantially transversely to the said fitting and removal direction, the fins being adapted to engage with a smooth surface of the said mounting component of the reflector, by being deformed so as to retain the intermediate fastening element by friction in the mounting component of the reflector.

In one embodiment of the headlamp according to the invention, each resiliently deformable fin is in the form of a ring which has, firstly, an upper surface facing towards the support element and extending transversely to the said fitting and removal direction, and, secondly, a lower surface which faces towards the reflector and which extends in a direction which is oblique to the said fitting and removal direction, in a sense opposed to that in which the intermediate fastening element is introduced to the mounting component of the reflector, towards the said smooth surface, during assembly.

In a preferred embodiment of the headlamp according to the invention, the intermediate fastening element comprises a cylindrical body which is provided with the said resiliently deformable fins on its outer surface, the said body, or body portion, being adapted to be engaged by insertion in the said fitting and removal direction into a blind hole having a smooth wall of the said mounting component of the reflector, so that the said fins engage with the said smooth wall of the blind hole by being deformed into a form in which they are inclined in a direction that is oblique with respect to the said fitting and removal direction, in a sense opposed to the sense in which the body portion is introduced into the said blind hole during assembly.

According to the invention in a second aspect, an intermediate fastening element, for fastening a reflector on a support element of a motor vehicle headlamp, and having a first end adapted to cooperate with the said support element and a second end adapted to cooperate with a mounting component of the said reflector in a fitting and removal direction, is characterised in that the said intermediate fastening element includes resiliently deformable fins which extend generally and substantially transversely to the said fitting and removal direction, the fins being adapted to engage with a smooth surface of the said mounting component of the reflector, by being deformed so as to retain the intermediate fastening element by friction in the said mounting component of the reflector.

Further features and advantages will appear more clearly upon a reading of the following detailed description of a preferred embodiment of the invention, which is given by way of non-limiting example only, and with reference to the accompanying drawings.

BRIEF DESCRIPTION OF THE DRAWINGS

FIG. 1 is a side view of an intermediate fastening element in accordance with the invention.

FIG. 2 is a view in longitudinal cross section of the intermediate fastening element of FIG. 1.

FIG. 3 is a detail view, in cross section, showing one fin of the intermediate fastening element of FIG. 1.

FIG. 4 shows, in longitudinal cross section, the engagement of the intermediate fastening element of FIG. 1 in a mounting component.

FIG. 5 represents, in cross section, an attempt to remove the intermediate fastening element of FIG. 1 from the mounting component.

DESCRIPTION OF A PREFERRED EMBODIMENT OF THE INVENTION

Figure 6:
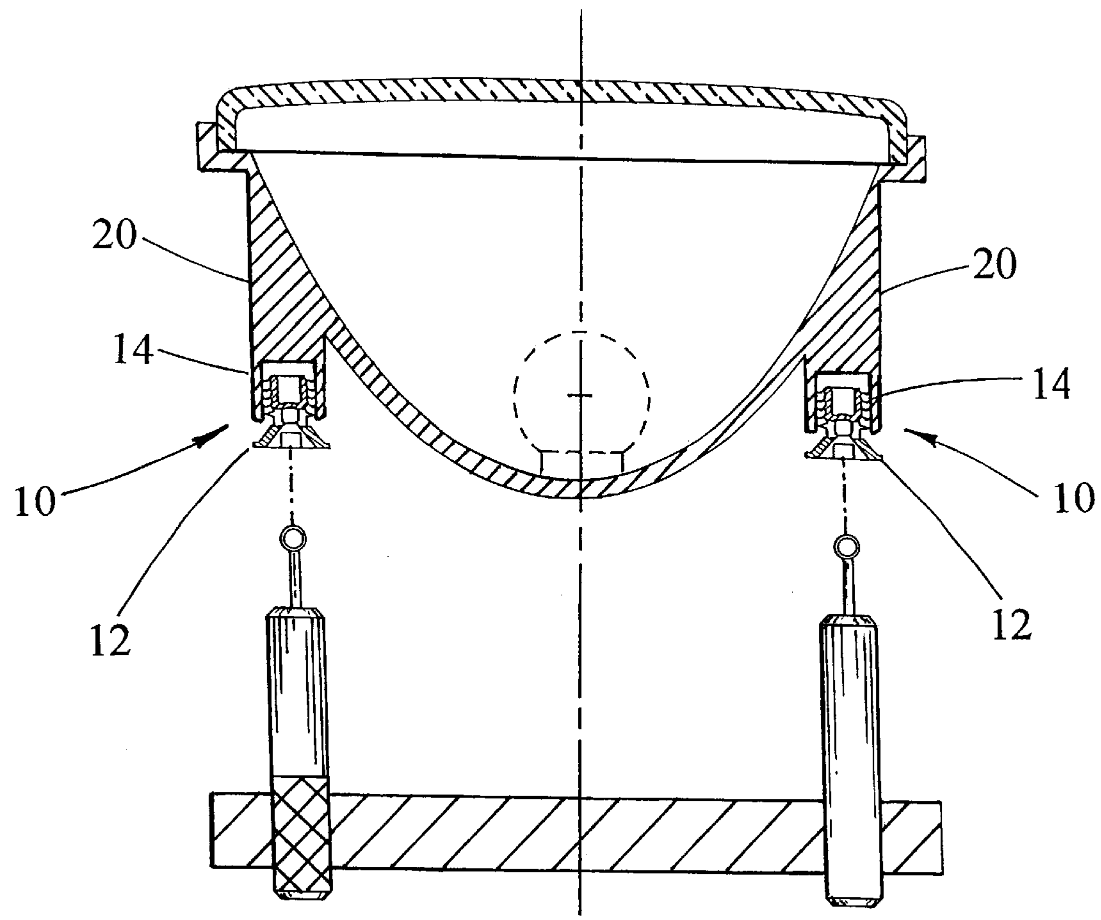
FIG. 6 represents, in cross section, a reflector, an intermediate fastening element and the mounting component.

FIGS. 1 and 2 show an intermediate fastening element 10 which is intended in particular for fastening a reflector (not shown) on to a support element of a motor vehicle headlamp (not shown).

The intermediate fastening element 10 extends in a general longitudinal direction X, which is the direction in which the fastening element 10 is fitted and removed with respect to the mounting component 20 (FIGS. 4 and 5) of the reflector. The fastening element 10 (referred to in the rest of this description as a fastener) has a first end 12 which is adapted to cooperate with the support element of the headlamp mentioned above.

The expression "support element" is to be understood to mean, for example, an adjusting rod which is mounted for longitudinal or translational movement on a fixed portion (not shown) of the headlamp, such as a headlamp housing or a portion of the bodywork of the vehicle having the headlamp; alternatively it may for example be a mounting rod secured on a fixed part of a headlamp.

The first end 12 of the fastener 10 includes a recess or socket 13 which extends generally in the fitting and removal direction X of the fastener and which is open towards the outside. The side walls of the socket 13 are provided with cut-out portions which define elastic tongues 13*a* for the snap-fitting of the socket 13 in the first end 12 on the terminal sphere, or ball end, of an adjusting or mounting rod of the headlamp.

In addition, the intermediate fastening element 10 shown in FIGS. 1 and 2 includes a body portion 11, which in this example is a hollow cylindrical body extending in the direction X. The body portion 11 has on its outer surface 11 a a plurality of resiliently deformable fins 14. These fins 14 are spaced apart at regular intervals along the length of the body portion 11, and project generally and substantially transversely to the fitting direction X. The fins 14 are adapted, as is shown most particularly in FIGS. 4 and 5 (to be described in greater detail later herein), to come into engagement with a smooth surface 21 of the mounting component 20 of the reflector. In coming into contact with the surface 21, the fins 14 are deformed, so as to retain the fastener 10 on the mounting component 20 by friction.

Each fin 14 is in the form of a ring surrounding the body portion 11. Each of these rings has an upper surface 14*a* which faces towards the support element, and a lower surface 14*b* which faces towards the reflector. As is shown most particularly in FIG. 3, the upper surface 14*a* of each ring 14 is radial, i.e. it extends transversely to the fitting direction X, while the lower surface 14*b* follows an oblique direction Y, with respect to the fitting direction X, in a sense opposite to the sense $F_1$ (see FIG. 4) in which the fastener 10 is inserted during fitting of the latter in the mounting component 20 of the reflector, i.e. into contact with the smooth surface 21 of the latter. In particular, the lower surface 14*b* of each fin 14 defines an angle $\alpha$ with a direction transverse to the fitting direction X. The angle $\alpha$ has a value of the order of 7 degrees.

The intermediate fastening element 10 is made in a thermoplastics material having a known elasticity.

As is shown in FIG. 4, to which reference is now made, the body portion 11 of the fastener 10 is engaged within a blind hole 22 of the mounting component 20 of a reflector (not shown). Since the external diameter over the fins of the body portion 11 is greater than the internal diameter of the blind hole 22, the resiliently deformable fins 14 are engaged with the smooth wall 21 of the blind hole 22 by being deformed so that they become inclined in an oblique direction, with respect to the fitting direction X, which is more sharply accentuated than the initial oblique direction Y, this new, sharper, oblique direction being in the opposite sense to the sense $F_1$ mentioned above. Thus, the fins 14 enable the fastener 10 to be retained by friction in the mounting component 20.

When, as is shown most particularly in FIG. 5, to which reference is now made, an attempt is made to remove the fastener 10 from the mounting component 20 by pulling the body portion 11 of the fastener upwardly out of the blind hole 22, the fins 14 become deformed by bending, in such a way that the ends of these fins become fixed in the smooth wall 21 of the blind hole 22, opposing any movement tending to extract the fastener from the mounting component 20 in the direction $F_2$.

The assembly consisting of the reflector and the intermediate fastening element cannot be dismantled, since removal of the fastener 10 cannot be achieved without involving rupture of the fins 14 and destruction of the fastener itself.

The present invention is in no way limited to the embodiment described above and shown in the drawings, but may be modified in any way within the spirit of the invention and within the competence of the person skilled in the art.

What is claimed is:

1. An intermediate fastener adapted to secure a reflector having a mounting component to a support, the intermediate fastener comprising a first end adapted to cooperate with the support;

a second end adapted to cooperate with the mounting component; and a plurality of resiliently deformable fins extending substantially perpendicularly to a longitudinal axis defined by the fastener, the fins being adapted to frictionally engage the mounting component when the second end cooperates with the mounting component;

wherein each of the fins has an upper surface facing towards the support extending perpendicularly to the longitudinal axis.

2. A fastener according to claim 1, wherein each of the fins has a lower surface extending obliquely with respect to the longitudinal axis.

3. A fastener according to claim 2, wherein the lower surface of each of the fins and the longitudinal axis define an angle of about 97°.

4. A fastener according to claim 1, wherein the mounting component includes a blind hole with an internal surface, and wherein the intermediate fastener comprises a cylindrical body having an outer surface carrying the fins, the body portion being adapted to be introduced in a fitting direction into the blind hole so that the fins deform and become inclined in a direction oblique to the fitting direction in a sense opposite to the sense in which the body is introduced into the blind hole, and engage with the internal surface of the blind hole.

5. A fastener according to claim 1, wherein the support is an adjusting rod carried by a fixed part of a headlamp configured for translational movement, the adjusting rod having a terminal sphere, and wherein the first end of the intermediate fastener is adapted to be snap-fitted on the sphere.

6. A fastener according to claim 1, wherein the support is a mounting rod carried by a fixed part of a headlamp, the mounting rod having a terminal sphere, and wherein the first end of the intermediate fastener is adapted to be snap-fitted on the sphere.

7. A fastener according to claim 1, wherein the intermediate fastener is made of an elastic thermoplastic material.

8. An intermediate fastening element adapted to mount a reflector on a support element of a motor vehicle headlamp comprising:

a body having a first end adapted to cooperate with the support element and a second end adapted to cooperate with a mounting component of the reflector, the fastening element defining a fitting direction, wherein said cooperation of the first end and second end of the fastening element with the support element and the mounting component respectively are defined in the fitting direction, wherein the intermediate fastening element further comprises resiliently deformable fins carried by the body, said fins extending generally substantially perpendicularly to the fitting direction, the mounting component having a smooth internal surface, the fins being adapted to engage against the smooth surface by deforming so as to hold the intermediate fastening element and the mounting component together by friction, and wherein a lower surface of each said fins, facing towards the reflector, and the perpendicular axis define an angle less than about 7 degrees.

9. A fastener comprising:

a body with a top end adapted to cooperate with a support of a headlamp and a bottom end adapted to cooperate with a mounting component of a reflector, the body defining a longitudinal axis; and a plurality of resiliently deformable protrusions carried on the bottom end, and configured to frictionally engage the mounting component, wherein each of the protrusions has a bottom surface facing the bottom end, and the bottom surface defines an angle less than about 97° with respect to the longitudinal axis.

10. A fastener according to claim 9, wherein the protrusions are a plurality of longitudinally offset annular ribs.

11. A fastener according to claim 10, wherein a diameter of the fastener at a point corresponding with an uppermost surface of each rib, facing the top end, is greater than a diameter of the fastener at a point corresponding with a lowermost surface of each rib, facing the bottom end.

12. A fastener according to claim 11, wherein the diameter of the the fastener at a point corresponding with the lowermost surface is substantially equal to the diameter of the body at that point.

13. A fastener according to claim 12, wherein the bottom surface and body delimit an angle substantially equal to 97°.

14. A fastener according to claim 9, wherein at least the bottom end of the body is adapted to engage a recess in the mounting element to deform the protrusions and frictionally secure the fastener to the reflector.

15. A fastener according to claim 9, wherein the top end of the body is adapted to be snap-fitted on to a balled end of the support.

16. A fastener according to claim 9, wherein the fastener is made of a thermoplastic material.

17. A fastener according to claim 9, wherein the protrusions are a plurality of longitudinally offset annular ribs with a diameter of a top surface of each rib, facing the top end, greater than a diameter of a bottom surface of each rib, facing the bottom end;

wherein the diameter of the bottom surface is substantially equal to the diameter of the body at that point, such that the bottom surface of the ribs and body delimit with the longitudinal axis an angle substantially equal to 97°;

wherein at least the bottom end of the body is adapted to engage the walls of a recess in the mounting element to deform the protrusions and frictionally secure the fastener to the reflector;

wherein the top end of the body is adapted to be snap-fitted on to a balled end of the support; and wherein the fastener is made of a thermoplastic material.

18. A headlamp assembly comprising:

a headlamp having an adjusting rod configured to permit translational movement;

a reflector with a mounting component;

an intermediate fastener having a body with a plurality of resiliently deformable protrusions adapted to frictionally engage the mounting component, the fastener also being adapted to be snap-fitted onto a balled end of the adjusting rod, wherein each of the protrusions has a bottom surface facing the reflector, and the bottom surface and a longitudinal axis define an angle less than about 97°.

19. A motor vehicle comprising:

a headlamp having a supporting element;

a reflector having a mounting component; and a fastener according to claim 9.

20. A motor vehicle headlamp comprising:

a support;

a reflector having a mounting component; and an intermediate fastener adapted to secure the reflector to the support, the intermediate fastener further comprising a first end adapted to cooperate with the support; and a second end adapted to cooperate with the mounting component and a plurality of resiliently deformable fins extending substantially perpendicularly to a longitudinal axis defined by the fastener, the fins being adapted to frictionally engage the mounting component when the second end cooperates with the mounting components, wherein each of the fins of the intermediate fastener has an upper surface facing towards the support extending perpendicularly to the longitudinal axis.

21. The headlamp of claim 20, wherein each of the fins has a lower surface extending obliquely with respect to the longitudinal axis.

22. The headlamp of claim 21, wherein the lower surface of each of the fins and the longitudinal axis define an angle of about 97°.

23. The headlamp of claim 20, wherein the mounting component includes a blind hole with an internal surface, and wherein the intermediate fastener comprises a cylindrical body having an outer surface carrying the fins, the body portion being adapted to be introduced in a fitting direction into the blind hole so that the fins deform and become inclined in a direction oblique to the fitting direction in a sense opposite to the sense in which the body is introduced into the blind hole, and engage with the internal surface of the blind hole.

24. The headlamp of claim 20, comprising a fixed part configured for translational movement;

wherein the support is an adjusting rod carried by the fixed part, the adjusting rod having a terminal sphere, and wherein the first end of the intermediate fastener is adapted to be snap-fitted on the sphere.

25. The headlamp of claim 20, comprising a fixed part configured for translational movement;

wherein the support is a mounting rod carried by the fixed part, the mounting rod having a terminal sphere, and wherein the first end of the intermediate fastener is adapted to be snap-fitted on the sphere.

26. The headlamp of claim 20, wherein the intermediate fastener is made of an elastic thermoplastic material.

* * * * *